US010170020B2

(12) United States Patent
Cwidak et al.

(10) Patent No.: US 10,170,020 B2

(45) Date of Patent: Jan. 1, 2019

(54) POP-UP DISPLAY WITH TRANSLATING STOP MEMBER

(71) Applicant: R. R. Donnelley & Sons Company, Chicago, IL (US)

(72) Inventors: Douglas R. Cwidak, Arlington Heights, IL (US); Robert B. Lipscomb, Plainfield, IL (US); William David Collings, Wheaton, IL (US); Marcellino Santoro, Jr., Barlett, IL (US)

(73) Assignee: R.R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 15/261,178

(22) Filed: Sep. 9, 2016

(65) Prior Publication Data

US 2018/0075781 A1 Mar. 15, 2018

(51) Int. Cl.

*G06F 1/06* (2006.01)
*G09F 1/06* (2006.01)

(Continued)

(52) U.S. Cl.

CPC ................ *G09F 1/065* (2013.01); *G09F 1/10* (2013.01); *G09F 15/0062* (2013.01)

(58) Field of Classification Search

CPC ........ G09F 1/06; G09F 1/065; G09F 15/0025; G09F 15/0031; G09F 15/0062; A47F 5/112

See application file for complete search history.

(56) References Cited

U.S. PATENT DOCUMENTS 822,841 A 6/1906 Hill
956,916 A 5/1910 Wiederseim, Jr.

(Continued)

FOREIGN PATENT DOCUMENTS

CN 203192354 9/2013
DE 2658506 1/1978

(Continued)

OTHER PUBLICATIONS

United States Patent and Trademark Office, "Notice of Allowance," issued in connection with U.S. Appl. No. 14/709,285, dated Jul. 3, 2017, 19 pages.

(Continued)

*Primary Examiner* — Charles A Fox
*Assistant Examiner* — Christopher E Veraa
(74) *Attorney, Agent, or Firm* — Hanley, Flight and Zimmerman, LLC

(57) ABSTRACT

A pop-up display apparatus includes a shroud having first and second sheets disposed in opposition to one another, the first and second sheets being connected to one another at a first side by a first joint and at a second side by a second joint. A stop member is disposed between the first and second sheets between the first and second joints and is connected to the first and second joints at a first height of the shroud. The stop member includes first and second stop elements arranged for translational movement in opposite directions relative to one another between a first and a second position. An elastic member, separate from the stop member, is connected to the first and second joints at a second height, the elastic member and being configured to bias the first joint toward the second joint. The first position of the stop member corresponds to a stowed state of the pop-up display and a substantially flat shroud profile and the second position of the stop member corresponds to a (Continued)

deployed state of the pop-up display and a convex shroud profile.

17 Claims, 9 Drawing Sheets

(51) Int. Cl.
*G09F 15/00* (2006.01)
*G09F 1/10* (2006.01)

(56) References Cited

U.S. PATENT DOCUMENTS

| | | | |
|---|---|---|---|
| 1,028,147 | A | 6/1912 | Stranders |
| 1,545,771 | A | 7/1925 | Hout |
| 1,576,672 | A | 3/1926 | Miller |
| 1,656,341 | A | 1/1928 | Smith |
| 1,670,464 | A | 5/1928 | Marsh |
| 1,687,616 | A | 10/1928 | Huye |
| 1,902,566 | A | 3/1933 | Marsh |
| 2,108,349 | A | 2/1938 | Rasmussen |
| 2,113,288 | A | 4/1938 | Berger |
| 2,142,826 | A | 1/1939 | Rosello |
| 2,153,460 | A | 4/1939 | Giles |
| 2,210,317 | A | 8/1940 | Dueringer |
| 2,283,406 | A | 5/1942 | Bacon |
| 2,290,144 | A | 7/1942 | Katz |
| 2,404,089 | A | 7/1946 | Pollock |
| 2,601,374 | A | 6/1952 | Ditzler et al. |
| 2,637,924 | A | 5/1953 | Hutt |
| 2,728,461 | A | 12/1955 | Paige |
| 2,773,324 | A | 12/1956 | Drueck, Jr. |
| 2,833,074 | A | 5/1958 | Jannes |
| 2,892,276 | A | 6/1959 | Nelson |
| 2,918,178 | A | 12/1959 | Leone |
| 2,984,920 | A | 5/1961 | Acosta et al. |
| 3,015,898 | A | 1/1962 | Keeslar |
| 3,091,877 | A | 6/1963 | Luchsinger |
| 3,234,682 | A | 2/1966 | Frankl |
| 3,267,597 | A | 8/1966 | Jannes |
| 3,302,321 | A | 2/1967 | Walker |
| 3,571,958 | A | 3/1971 | Stevens et al. |
| 3,665,669 | A | 5/1972 | Huber |
| 3,666,607 | A | 5/1972 | Weissman |
| 4,234,148 | A | 11/1980 | Maddestra et al. |
| 4,610,363 | A | 9/1986 | Flum et al. |
| 4,619,426 | A | 10/1986 | Drueck, Jr. |
| 4,750,283 | A | 6/1988 | Halpern |
| 4,770,379 | A | 9/1988 | Estvold |
| 4,773,622 | A | 9/1988 | Herlin |
| 4,774,780 | A | 10/1988 | Crowell |
| 4,790,714 | A | 12/1988 | Schnapp |
| 4,854,060 | A | 8/1989 | Corbo et al. |
| 4,940,199 | A | 7/1990 | Hall |
| 4,984,848 | A | 1/1991 | Scalisi et al. |
| 4,993,846 | A | 2/1991 | Diamond et al. |
| 5,000,717 | A | 3/1991 | Pfeiffer |
| 5,193,466 | A | 3/1993 | Eder |
| 5,197,631 | A | 3/1993 | Mishima |
| 5,297,677 | A | 3/1994 | Burian et al. |
| 5,416,997 | A | 5/1995 | Dyment et al. |
| 5,454,180 | A | 10/1995 | Volpe |
| 5,467,547 | A | 11/1995 | Fortner |
| 5,632,390 | A | 5/1997 | Podergois |
| 5,752,649 | A | 5/1998 | Weder |
| 5,758,438 | A | 6/1998 | Crowell |
| 5,778,959 | A | 7/1998 | Guetschow |
| 5,787,621 | A | 8/1998 | Leksell |
| 5,809,673 | A | 9/1998 | Johnson et al. |
| 5,868,367 | A | 2/1999 | Smith |
| 5,878,945 | A | 3/1999 | Weder |
| 5,937,553 | A | 8/1999 | Maran |
| 5,966,857 | A | 10/1999 | Pettersson et al. |
| 5,983,538 | A | 11/1999 | Crowell |
| 6,311,418 | B1 | 11/2001 | Crowell |
| 6,347,772 | B1 | 2/2002 | L'Hôtel |
| 6,497,601 | B1 | 12/2002 | Ward |
| 7,134,230 | B1 | 11/2006 | Boens et al. |
| 7,159,350 | B2 | 1/2007 | L'Hôtel |
| 7,234,253 | B2 | 6/2007 | Ossmann |
| 7,437,842 | B2 | 10/2008 | Sgambellone |
| 7,634,865 | B2 | 12/2009 | L'Hôtel |
| 7,726,054 | B2 | 6/2010 | Mestres Armengol et al. |
| 7,774,964 | B2 | 8/2010 | L'Hôtel |
| 7,980,013 | B2 | 7/2011 | Hsu |
| 8,099,883 | B2 | 1/2012 | Mestres Armengol et al. |
| 8,112,925 | B2 | 2/2012 | Tzuo |
| 8,291,631 | B2 | 10/2012 | Wilder |
| 8,458,939 | B2 | 6/2013 | Arthur et al. |
| 8,590,188 | B2 | 11/2013 | Mirsch |
| 8,701,321 | B2 | 4/2014 | Da Fonseca et al. |
| 8,776,415 | B2 | 7/2014 | Kawaguchi et al. |
| 8,826,833 | B1 | 9/2014 | Fischer et al. |
| 8,863,418 | B2 | 10/2014 | Acker et al. |
| 8,875,908 | B2 | 11/2014 | L'Hotel |
| 9,173,485 | B2 | 11/2015 | Fischer et al. |
| 9,715,840 | B1 | 7/2017 | Warmus |
| 10,008,138 | B2 | 6/2018 | Bonifas |
| 2004/0111930 | A1 | 6/2004 | Ossmann |
| 2008/0066353 | A1 | 3/2008 | Mills |
| 2008/0083146 | A1 | 4/2008 | Martin Presa |
| 2010/0072330 | A1 | 3/2010 | Tzuo |
| 2010/0236117 | A1 | 9/2010 | Mestres Armengol et al. |
| 2011/0088300 | A1 | 4/2011 | Martin Presa |
| 2011/0179685 | A1* | 7/2011 | Mirsch .................... G09F 1/065 40/610 |
| 2012/0012734 | A1* | 1/2012 | Tzuo ......................... G09F 1/06 248/683 |
| 2012/0227297 | A1 | 9/2012 | Kawaguchi et al. |
| 2013/0219760 | A1 | 8/2013 | Acker et al. |
| 2014/0265777 | A1 | 9/2014 | Fischer et al. |
| 2016/0335925 | A1 | 11/2016 | Ruhaak |
| 2016/0335934 | A1 | 11/2016 | Lyon |
| 2016/0335935 | A1 | 11/2016 | Lyon |
| 2017/0193866 | A1 | 7/2017 | Bonifas |
| 2017/0213485 | A1 | 7/2017 | Santoro, Jr. |
| 2017/0294149 | A1 | 10/2017 | Lyon |
| 2018/0040262 | A1 | 2/2018 | Lyon |
| 2018/0075788 | A1 | 3/2018 | Warmus et al. |
| 2018/0211571 | A1 | 7/2018 | Enriquez |

FOREIGN PATENT DOCUMENTS

| | | |
|---|---|---|
| DE | 4005925 | 10/1991 |
| DE | 4314654 | 11/1994 |
| DE | 9320993 | 8/1995 |
| DE | 202010015312 | 1/2011 |
| DE | 202011002980 | 4/2011 |
| DE | 202014106297 | 3/2015 |
| DK | 9500055 | 5/1995 |
| DK | 9500277 | 9/1995 |
| EP | 1741368 | 1/2007 |
| EP | 1830334 | 9/2007 |
| EP | 1926076 | 5/2008 |
| EP | 2290637 | 3/2011 |
| EP | 2400477 | 12/2011 |
| ES | 2212927 | 8/2004 |
| ES | 2255857 | 7/2006 |
| FR | 1254983 | 3/1961 |
| FR | 2210317 | 7/1974 |
| FR | 2232259 | 12/1974 |
| FR | 2233912 | 1/1975 |
| FR | 2571949 | 4/1986 |
| FR | 2574968 | 6/1986 |
| FR | 2650907 | 2/1991 |
| FR | 2680030 | 2/1993 |
| FR | 2691621 | 12/1993 |
| FR | 2730148 | 8/1996 |
| FR | 2735264 | 12/1996 |
| FR | 2745109 | 8/1997 |
| FR | 2760801 | 9/1998 |
| FR | 2760802 | 9/1998 |
| FR | 2760880 | 9/1998 |
| FR | 2770320 | 4/1999 |

(56) References Cited

FOREIGN PATENT DOCUMENTS

| | | | |
|---|---|---|---|
| FR | 2911425 | | 7/2008 |
| FR | 2925203 | | 6/2009 |
| FR | 2925204 | | 6/2009 |
| FR | 2948222 | | 1/2011 |
| GB | 463574 | | 4/1937 |
| GB | 740577 | | 11/1955 |
| GB | 743378 | | 1/1956 |
| GB | 824004 | | 11/1959 |
| GB | 1034280 | | 6/1966 |
| GB | 1272187 | | 4/1972 |
| GB | 1317155 | | 5/1973 |
| WO | 9634379 | | 10/1996 |
| WO | 9936900 | | 7/1999 |
| WO | 2002095719 | | 11/2002 |
| WO | 2004044867 | | 5/2004 |
| WO | 2006040438 | | 4/2006 |
| WO | 2006067252 | | 6/2006 |
| WO | 2007138083 | | 12/2007 |
| WO | 2008049176 | | 5/2008 |
| WO | 2010019086 | | 2/2010 |
| WO | 2010130485 | | 11/2010 |
| WO | 2011092209 | | 8/2011 |
| WO | 2011113123 | | 9/2011 |
| WO | 2012061375 | | 5/2012 |
| WO | 2016057067 | | 4/2016 |
| WO | 2017116605 | A1 | 7/2017 |

OTHER PUBLICATIONS

United States Patent and Trademark Office, "Non-Final Office Action," issued in connection with U.S. Appl. No. 14/709,266, dated May 23, 2016, 32 pages.

United States Patent and Trademark Office, "Notice of Allowance," issued in connection with U.S. Appl. No. 14/709,266, dated Sep. 26, 2016, 31 pages.

United States Patent and Trademark Office, "Non-Final Office Action," issued in connection with U.S. Appl. No. 14/709,285, dated Sep. 15, 2016, 38 pages.

United States Patent and Trademark Office, "Non-Final Office Action," issued in connection with U.S. Appl. No. 14/711,739, dated Sep. 16, 2016, 91 pages.

United States Patent and Trademark Office, "Non-Final Office Action," issued in connection with U.S. Appl. No. 15/229,920, dated Dec. 1, 2016, 9 pages.

International Searching Authority, "International Search Report and Written Opinion", issued in connection with PCT Application No. PCT/US2016/064478, dated Jan. 24, 2017, 15 pages.

United States Patent and Trademark Office, "Non-Final Office Action," issued in connection with U.S. Appl. No. 15/415,587, dated Aug. 4, 2017, 40 pages.

United States Patent and Trademark Office, "Notice of Allowance," issued in connection with U.S. Appl. No. 15/229,920, dated Mar. 22, 2017, 43 pages.

United States Patent and Trademark Office, "Final Office Action," issued in connection with U.S. Appl. No. 14/709,285, filed Mar. 15, 2017, 24 pages.

United States Patent and Trademark Office, "Final Office Action," issued in connection with U.S. Appl. No. 14/711,739, filed Mar. 21, 2017, 19 pages.

United States Patent and Trademark Office, "Non-Final Office Action," issued in connection with U.S. Appl. No. 14/988,616, filed Apr. 11, 2017, 36 pages.

United States Patent and Trademark Office, "Notice of Allowance," issued in connection with U.S. Appl. No. 14/709,266, filed Apr. 12, 2017, 17 pages.

International Searching Authority, "International Search Report," issued in connection with PCT Patent Application No. PCT/US2017/045471, dated Oct. 18, 2017, 5 pages.

International Searching Authority, "Written Opinion," issued in connection with PCT Patent Application No. PCT/US2017/045471, dated Oct. 18, 2017, 6 pages.

United States Patent and Trademark Office, "Final Office Action," issued in connection with U.S. Appl. No. 14/988,616, filed Oct. 30, 2017, 28 pages.

United States Patent and Trademark Office, "Notice of Allowance," issued in connection with U.S. Appl. No. 14/988,616, filed Feb. 28, 2018, 8 pages.

United States Patent and Trademark Office, "Notice of Allowance," issued in connection with U.S. Appl. No. 15/415,587, dated Jan. 19, 2018, 7 pages.

United States Patent and Trademark Office, "Non- Final Office action," issued in connection with U.S. Appl. No. 15/634,974, dated Apr. 9, 2018, 11 pages.

United States Patent and Trademark Office, "Non-Final Office action", issued in connection with U.S. Appl. No. 15/786,405, dated Oct. 2, 2018, 31 pages.

United States Patent and Trademark Office, "Restriction Requirement", issued in connection with U.S. Appl. No. 15/261,191, dated Aug. 31, 2018, 6 pages.

* cited by examiner

POP-UP DISPLAY WITH TRANSLATING STOP MEMBER

FIELD OF THE DISCLOSURE

This disclosure relates generally to displays and, more particularly, to self-erectable displays, methods of making such self-erectable displays, and mechanisms for maintaining such self-erectable displays in an erect state.

BACKGROUND

Displays may be used at a point of purchase to provide advertising or other information. Some of these displays have a tubular shape and include outwardly facing indicia.

BRIEF DESCRIPTION OF THE DRAWINGS

The figures are not to scale. Wherever possible, the same reference numbers will be used throughout the drawings and accompanying written description to refer to the same or like parts.

DETAILED DESCRIPTION

The examples disclosed herein relate to self-erectable or pop-up displays that can be used for point-of-sale advertising, providing information or for other suitable purposes. The example self-erectable displays disclosed herein are configured to be collapsed to a folded, flat state, which facilitates shipping and transport, and readily erected at a location (e.g., a point-of-sale, a conference booth, a store, etc.) to effect a desired display function.

In some examples disclosed herein, the example self-erectable displays include one or more substrates (e.g., a sheet material, a panel, etc.) that, singly or in combination, form a tubular shroud into which one or more internal support structures are disposed or are able to be disposed. In some examples, the shroud defines a generally oblong cross-section having, along a longitudinal direction thereof (e.g., a height), a major axis dimension (e.g., a width) and a minor axis dimension (e.g., a depth). A base structure is optionally attached to or integrated with one or more portions of the shroud, such as a base portion, to help to maintain the shroud in a desired orientation. While one particular example of an oblong cross-section is depicted herein, the present concepts include other manners of cross-sectional profile including, but not limited to, a triangular, square, diamond, circular, or other semi-circular, elliptical, polygonal shape, and/or non-polygonal shapes.

In some examples, the example shroud is formed of an elongate substrate having top and bottom edges and first and second side edges. To enable the example self-erectable display to be folded for transport or shipping and/or storage, in some examples, longitudinal lines of weakness and/or transverse lines of weakness are defined by the shroud. These lines of weakness enable the example self-erectable display to be folded relatively flat, with adjacent segments of the shroud being folded against one-another along the lines of weakness, such as in a multi-part z-fold, for example.

In some examples, the shroud is formed from a plurality of substrates that are coupled together to form a 3-D structure defining an interior volume. In some examples, the example support is formed of two substrates and one or more support portions disposed therein. In some examples, the support portions are generally planar. In yet further examples, the support portions are generally planar and are further advantageously provided with a line of weakness to enable the support portion to be folded relatively flat within the example shroud for transport, shipping and/or storage. In another example, the shroud is formed from a single substrate.

As is described herein, the self-erectable display is formed by (1) assembling one or more substrates together with one or more support portions and (2) by unfurling a completed self-erectable display from a folded state.

Figure 1:
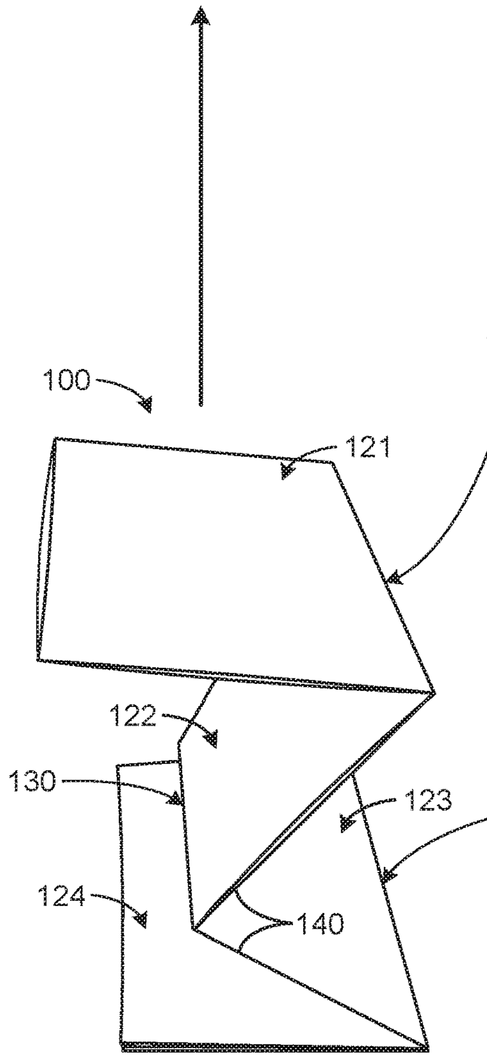
FIGS. 1-2 are perspective views of an example a pop-up display in accordance with teachings disclosed herein, showing the pop-up display transition from a folded state in FIG. 1 to an erected or deployed state in FIG. 2.
Figure 2:
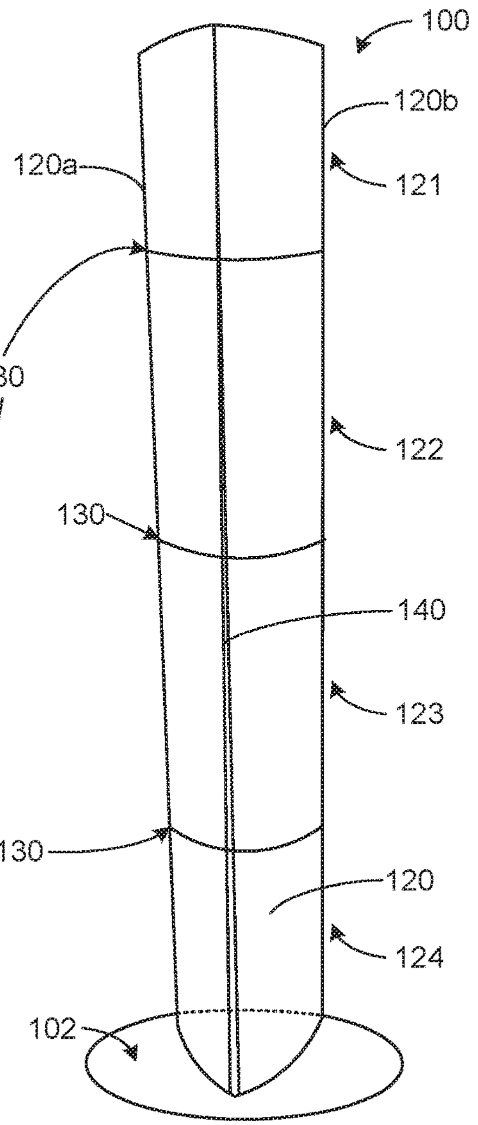

FIGS. 1-2 show an example of erecting a pop-up display 100, from a substantially flat initial state (not shown), to the depicted partially unfolded state (FIG. 1) and to the erected state (FIG. 2), in accordance with the teachings herein. In the example 4—segment pop-up display 100 depicted in FIGS. 1-2, the display is formed from sheets 120*a*, 120*b*, which are joined together to define a tubular structure or shroud 120.

The sheets 120*a*, 120*b* each include connection members at lateral portions therof to permit connection of the sheets 120*a*, 120*b* to one other to form the shroud 120. In one example, each of the sheets 120*a*, 120*b* has, at lateral portions thereof, flaps 140*a*, 140*b* (see, e.g., FIG. 3) that are connected (e.g., via connection members, elastic members, etc.) to corresponding opposing flaps (e.g., connecting flap 140*a* of sheet 120*a* to flap 140*b* of sheet 120*b* and connecting flap 140*b* of sheet 120*a* to flap 140*a* of sheet 120*b*) to form joints 140.

Each sheet 120*a*, 120*b* may comprise n segments, where n is any number including, but not limited to, 1 segment, 2 segments, 3 segments, 4 segments (as shown), or more than 4 segments. Where the sheets 120*a*, 120*b* comprise a plurality of segments, each segment (e.g., segments 121-124 in FIGS. 1-2) is hinged to an adjacent segment by a line of weakness 130 formed in the sheets 120*a*, 120*b*. Each line of weakness 130 is formed in substantially the same position, along a height of the shroud 120, so that the lines of weakness 130 of sheet 120*a* are substantially aligned with the lines of weakness 130 of sheet 120*b* and the segments thereof fold as a unit. For example, the line of weakness 130 joining segment 121 of sheet 120*a* is vertically aligned with the line of weakness 130 joining segment 121 of sheet 120*b* so that, when sheets 120*a*, 120*b* are collapsed to a substantially flat state, both sheets 120*a*, 120*b* fold segment 121 about the line of weakness 130 relative to the underlying segment 122.

Figure 9A:
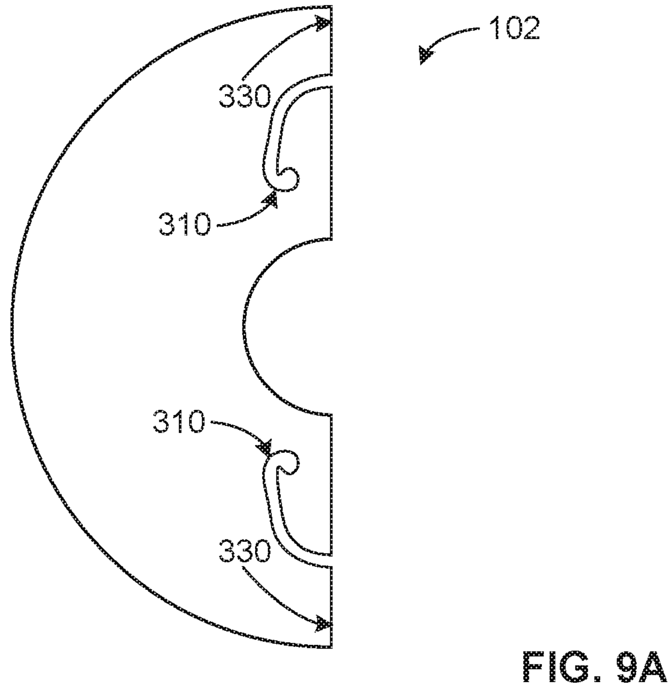
FIGS. 9*a*-9*b* show an example of a foldable stand that is optionally integrated with the pop-up display of FIGS. 1-8*b* in accordance with teachings disclosed herein.
Figure 9B:
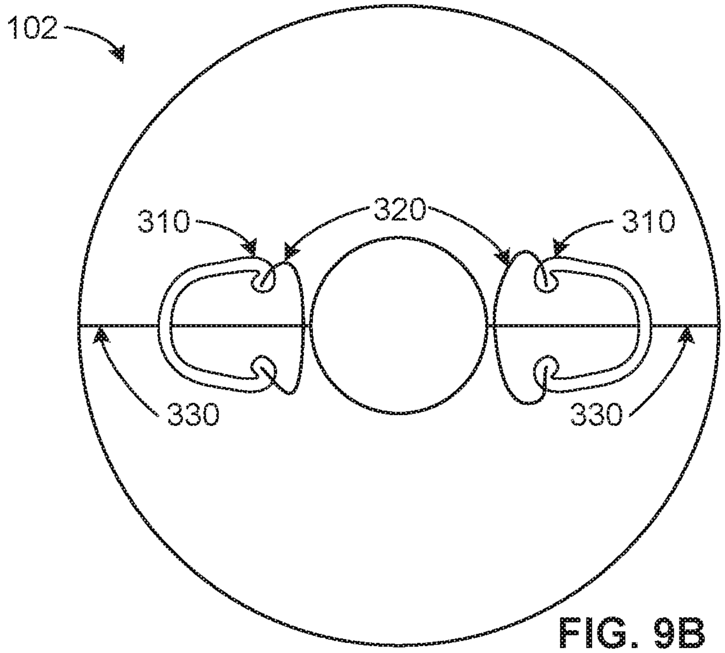

In the example shown in FIG. 2, the pop-up display 100 is supported by an optional base member 102, an example of which is shown in FIGS. 9*a*-9*b*. Alternatively, as the shroud 120 itself is entirely self-supporting, the base member 102 may be omitted.

In some examples, the pop-up display 100 is configured to automatically deploy (open fully) once the flat segments 121-124 from the stowed state have been unfolded or unfurled by rotating the segments 121-124 relative to another about the lines of weakness 130 to place the segments in a substantially vertical orientation. As discussed in more detail below, biasing forces of elastic members disposed internally within the volume of the shroud 120 are used to automatically constrict or collapse the support members to draw joints 140 of the shroud 120 inwardly to thereby force central portions of the sheets 120*a*, 120*b* outwardly to yield the tubular form of shroud 120. In other examples, additional elastic members are optionally disposed between adjacent segments (e.g., connecting segment 121 to segment 122, etc.) to provide additional biasing forces about the lines of weakness or joints between such adjacent segments to assist the unfolding or unfurling of the folded pop-up display 100.

The example pop-up display 100 shown in FIG. 2 can be collapsed, folded and stowed by pressing the sides of the display 100 along center portions of the faces of the sheets or sheet portions 120*a*, 120*b* (e.g., left-to-right inward force applied to the left sheet 120*a* in FIG. 2 and right-to-left inward force applied to right sheet 120*b* in FIG. 2, etc.) to counter the bias of the elastic members and to inwardly deform the curvilinear aspect of the erected sheets 120*a*, 120*b*. This deformation of the curvilinear aspect of the erected sheets 120*a*, 120*b*, causes expansion of the elastic members in the shroud 120 and expansion of the internal support structures in the shroud, as discussed below, until each segment (e.g., 121-123 in a three-segment display) attains a flattened state. Each flattened segment may then be rotated about the line of weakness 130 of an adjoining segment to fold the shroud 120.

Figure 3:
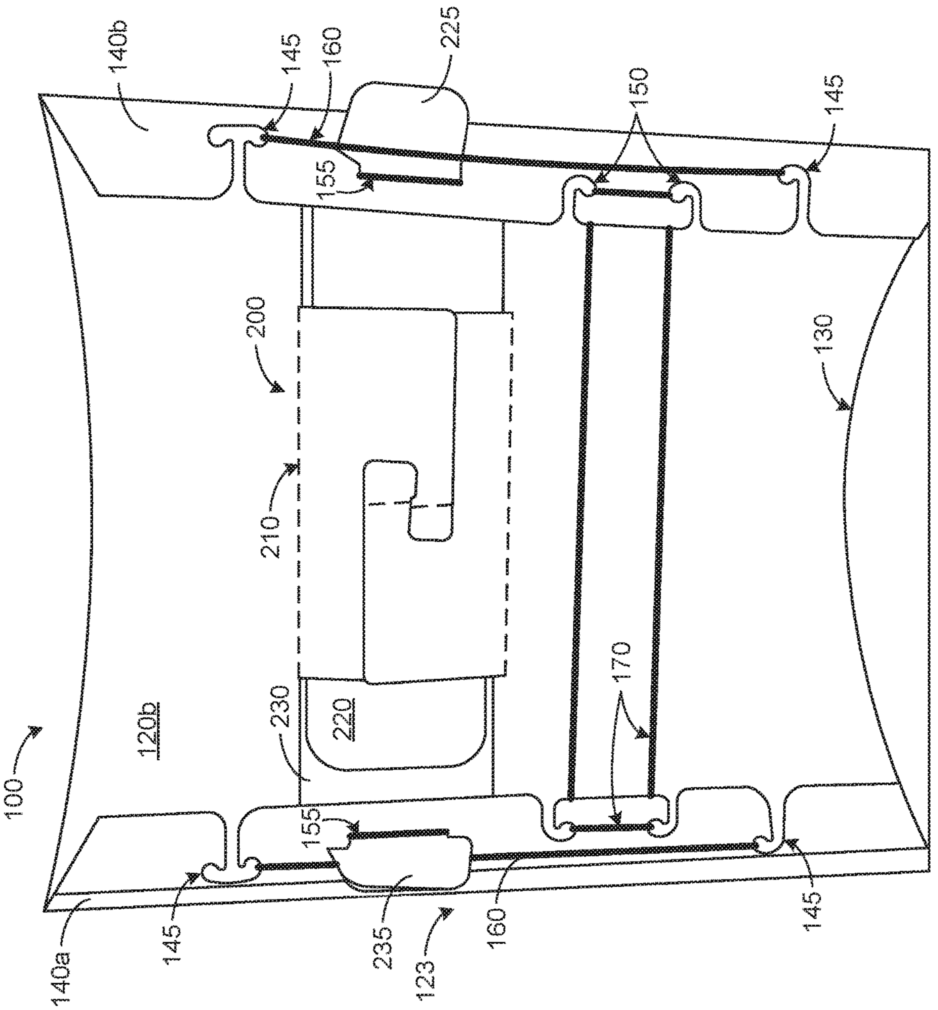
FIG. 3 is a close-up view of an internal volume of an example pop-up display in accordance with teachings disclosed herein, wherein a front sheet is removed for clarity.

FIG. 3 a close-up view of an internal volume of a bottom segment 123 of an example three-segment pop-up display 100 in accordance with teachings disclosed herein, wherein the pop-up display 100 is shown in an upside-down orientation. The front sheet 120*a* and the stand element 105 of FIG. 3 removed to show the interior of the pop-up display 100 and the rear sheet 120*b*. Sheet 120*b* includes, at lateral ends, flaps 140*a*, 140*b* that fold inwardly to project into an interior volume of the assembled pop-up display 100 (see, e.g., FIG. 4). Each of the flaps 140*a*, 140*b* defines a variety of features including example grooves 145, example grooves 150 and example slots 155, described below. These features are also correspondingly provided in the opposing sheet 120*a* (removed for clarity in FIG. 3).

Each set of example top and bottom grooves 145 in each example flap 140*a*, 140*b* of sheets 120*a*, 120*b* retains an example elastic member 160 that is used to connect example sheets 120*a*, 120*b* together. When sheet 120*b* is assembled together with sheet 120*a*, the elastic member 160 is disposed about both the top and bottom grooves 145 in each flap 140 of sheet 120*b* and, correspondingly, top and bottom grooves 145 in sheet 120*a*. These flap 140 features enable the elastic member 160 to connect the sheets 120*a*, 120*b*. Although these features are only shown for one bottom segment 123 of an example three segment pop-up display 100, similar features are included in sheet 120*a* and further in segments 121-122 of FIG. 3. As FIG. 3 shows the bottom segment 123 of the example pop-up display 100, in an upside-down orientation, it is noted that the "uppermost" grooves 145 in the orientation shown have a two-lobed configuration as compared to that of the "lower" grooves 145 depicted in FIG. 3. The extra lobe of each of the "uppermost" grooves 145 in the orientation shown forms fixation points to which attachment members (e.g., elastic members, etc.) from the stand 105 can be affixed to secure the stand 105 to the shroud 120.

While the example pop-up display uses top and bottom grooves 145 and elastic members 160 to connect example sheets 120*a*, 120*b* together, the sheets 120*a*, 120*b* may be connected to one another at one or more points along the flaps 140*a*, 140*b*, or joint formed thereby, using other conventional means of connection (e.g., adhesives, bonding, snap connectors, twist ties, slots/tabs, clamping elements, clips, hook-and-eye fasteners, hook-and-loop fasteners (e.g., VELCRO® brand fasteners, etc.), pins, and/or string, in any combination).

Slots 155 of flaps 140 are provided to permit tabs 225, 235 from the stop elements 220, 230 of the stop members 200 to pass through to thereby vertically secure the stop members 200 relative to the flaps 140*a*, 140*b*. As is more particularly shown in FIG. 6, the example stop element 220 tab 225 has a line of weakness 240 along the tab 225 to permit a portion 225*b* of the tab 225 to be folded over a base portion 225*a* of the tab 225. Once the tab portion 225*b* is folded along the line of weakness 240, the overall dimensions of the folded tab 225 are reduced sufficiently to permit insertion of the folded tab 225 through the slot 155 (e.g., through slot 155 formed in flap 140*b* as shown in FIG. 3, and then again through slot 155 in opposing flap 140*a* of sheet 120*a* (not shown)) where, following installation to connect sheets 120*a*, 120*b*, the folded tab 225 is unfolded so that tab portion 225*b* prevents the tab 225 from being displaced from the slot 155.

Figure 6:
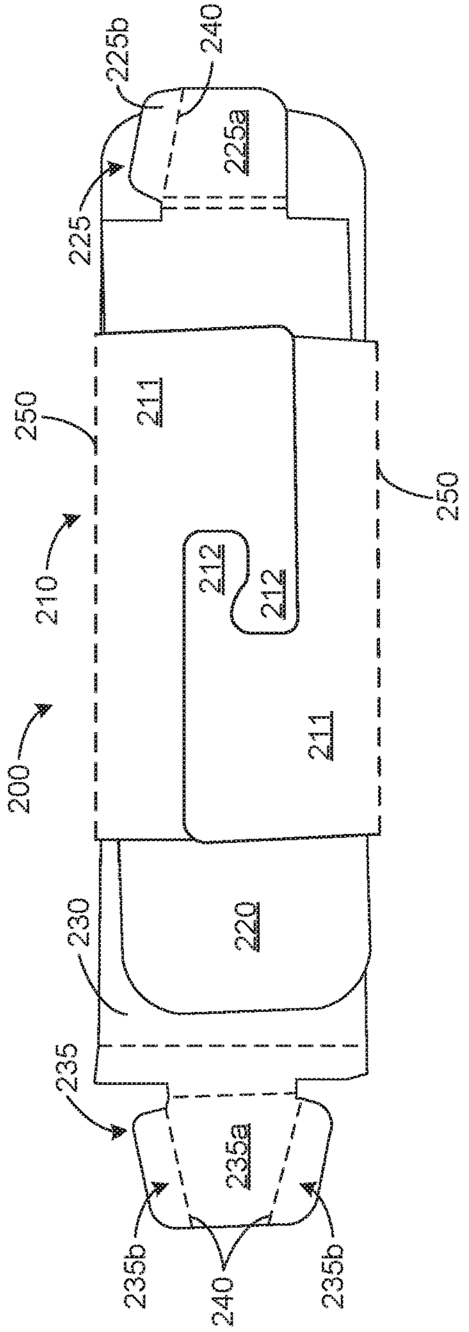
FIG. 6 is a front view of the example stop member of FIGS. 3-5, removed from the pop-up display for clarity, in accordance with teachings disclosed herein.

Similarly, as is more shown in FIG. 6, the example stop element 230 tab 235 has two lines of weakness 240 along the tab 235 to permit the portions 235*b* of the tab 235 to be folded over a base portion 235*a* of the tab 235. Once the tab portions 235*b* are folded along the lines of weakness 240, the overall dimensions of the folded tab 235 are reduced sufficiently to permit insertion of the folded tab 235 through the slot 155 (e.g., through slot 155 formed in flap 140*a* of sheet 120*b* as shown in FIG. 3, and then again through slot 155 in opposing flap 140*b* of sheet 120*a* (not shown in FIG. 3 for clarity)) where, following installation to connect sheets 120*a*, 120*b*, the folded tab 235 is unfolded so that tab portions 235*b* prevent the tab 235 from being displaced from the slot 155.

Although example tabs 225, 235 are shown in the example stop members 200 as one example of a means by which the stop members 200 can be secured relative to the flaps 140*a*, 140*b*, other conventional means of connection (e.g., adhesives, bonding, snap connectors, twist ties, slots/tabs, clamping elements, etc.) can be used to secure one or more stop members 200 to the flaps 140*a*, 140*b* or the joint 140 formed by the flaps.

Grooves 150 of flaps 140*a*, 140*b* are provided separate and apart from the stop member 200, above and/or below the stop member 200. As shown in the example of FIG. 3, an elastic member 170 is disposed to bridge the span between the grooves 150 of the left flap 140*a* and the grooves 150 of the right flap 140*b* and to apply an inwardly directed (e.g., horizontal force component, etc.) tensile force biasing the joints 140 (see, e.g., FIGS. 1-2) formed by the flaps 140*a*, 140*b* toward one another. In the example pop-up display 100 of FIG. 3, the stop member 200 is below the grooves 150 (i.e., as noted, the pop-up display 100 is upside-down in FIG. 3) and the elastic member 170. In other examples, the stop member 200 is above the grooves 150 and elastic member 170, between one or more sets of grooves 150 and elastic members 170, alternating therewith, or any other desired configuration or stop members 200 and elastic members.

In this example, the stop element 220 is disposed within the band element 210 of the stop element 230 to translate (e.g., horizontal movement, etc.) relative to the stop element 230 to facilitate corresponding translational movement of the tabs 225, 235 and the flaps 140*a*, 140*b* (and joints 140 formed thereby) connected thereto. In the example depicted in FIG. 3, the length of the stop element 230 determines the stopping point of inward movement between the joints 140 of the shroud 120 (see, e.g., FIG. 2) as a distal end of the stop element 230 (opposite the proximal end bearing the tab 235) is drawn into contact with the sheet 120*b*. The example band element 210 is disclosed in greater detail below.

Figure 4:
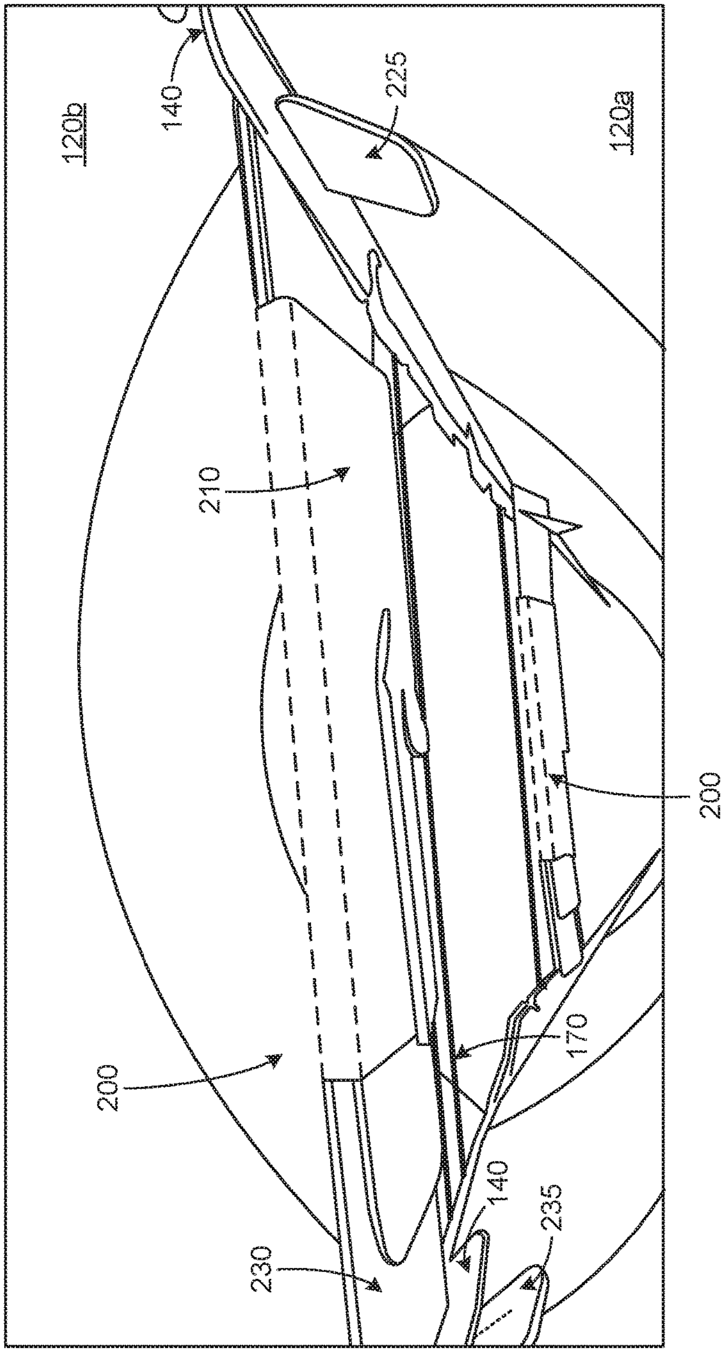
FIG. 4 is a bottom perspective view of an interior volume of an example pop-up display in accordance with teachings disclosed herein.

The view represented in FIG. 4 is a bottom perspective view of an interior volume of an example pop-up display 100 (i.e., looking upward from the bottom of the pop-up display 100) in the deployed state (see, e.g., FIG. 2). Sheets 120*a*, 120*b* are connected as described above. A bottommost stop member 200 corresponding to a bottommost segment (e.g., segment 123) of the shroud 120 is shown, as are a middle stop member 200 corresponding to a middle segment (e.g., segment 122) and a top stop member 200 corresponding to a top segment (e.g., segment 121). FIG. 4 shows an example connection of sheet 120*a* and sheet 120*b* via the tabs 225, 235 disposed through slots 155. In the installed position, these tabs 225, 235 are folded inwardly, back toward the interior volume of the shroud 120 or, stated differently, back over the stop member 200. Optionally, the folded tabs 225, 235 are attached to flaps or joints 140, or the respective stop elements 220, 230, such as by adhesives or mechanical connectors. As noted above, sheet 120*a* and sheet 120*b* are additionally optionally connected via vertical elastic members 160 disposed about the grooves 145 of abutting flaps 140*a*, 140*b* of the sheets 120*a*, 120*b*.

Figure 5:
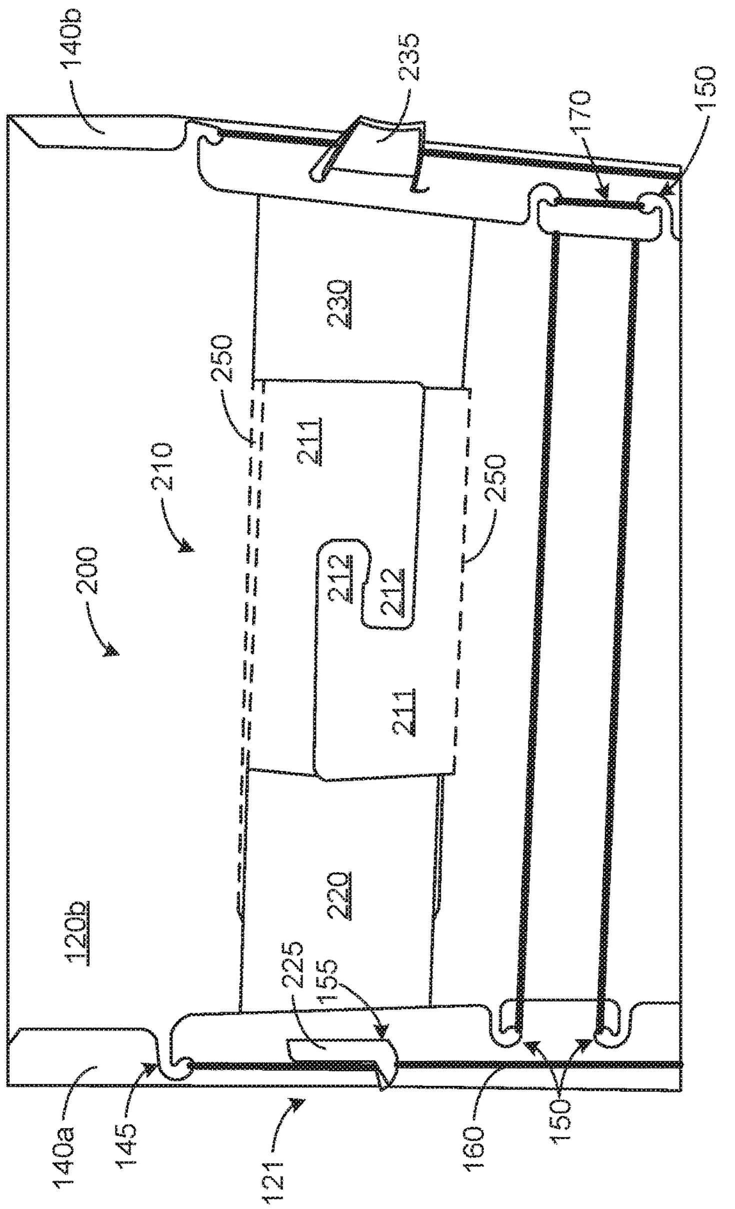
FIG. 5 is a front view of a portion of a stop member for the example pop-up display of FIGS. 3-4, wherein the sheet bearing the stop member is placed in a substantially flat position so as to cause the stop member to extend to its fullest extent, in accordance with teachings disclosed herein.

FIG. 5 is a front view of a portion of an example stop member 200 for the example pop-up display of FIGS. 3-4. In this figure, the sheet 120*b* shown to bear the stop member 200 (excluding the sheet 120*a* for clarity) is placed in a substantially flat position so as to cause elongation of the elastic member 170 (e.g., elastic band in the example shown) and elongation of the stop member 200, via translation of stop element 220 relative to stop element 230, to their fullest extent. As compared to the example deployed state represented in FIG. 3 and shown in FIG. 4, there is no concavity or curvature in the sheet 120*b* in FIG. 5 and the distal portion of the stop element 220 (opposite the proximal end bearing the tab 225) extending beyond the band element 210 in FIGS. 3-4 is drawn into and obscured by the band element 210 in FIG. 5.

Figure 7:
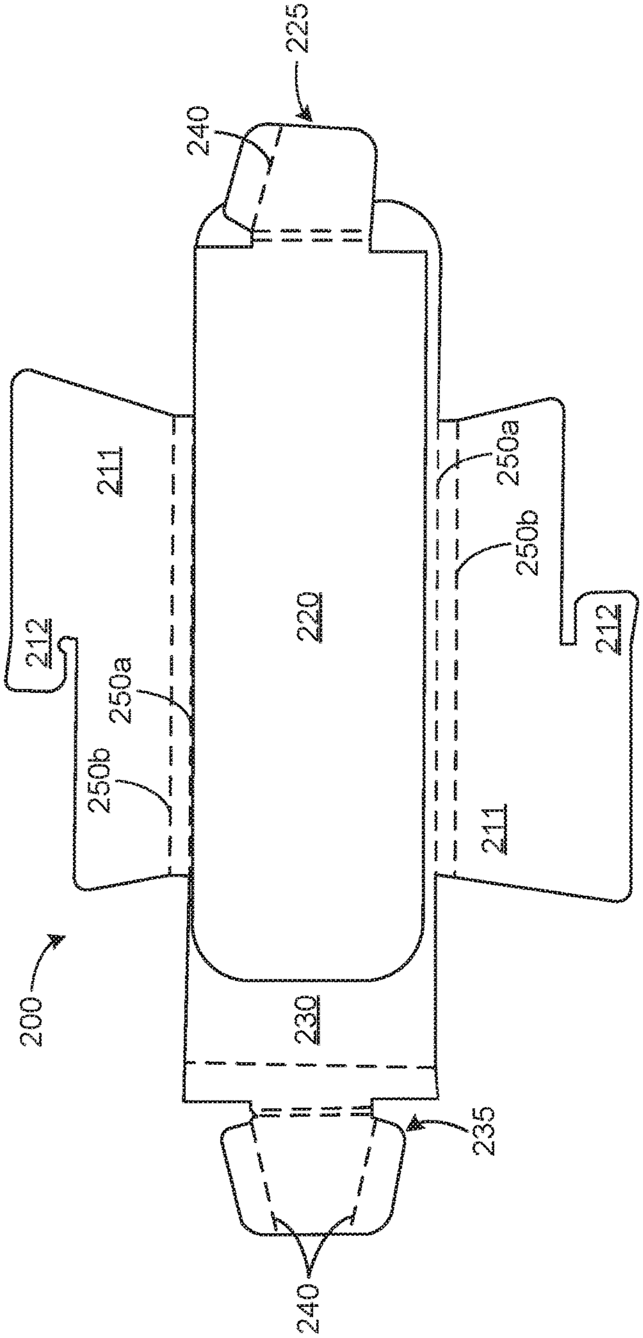
FIG. 7 is a front view of the example stop member of FIGS. 3-5, removed from the pop-up display and presented in a partially disassembled state for clarity, in accordance with teachings disclosed herein.

FIGS. 5-7 also show features of the construction of the support member 200, stop elements 220, 230 and band element 210. FIG. 5 shows that the band element 210 includes two locking tabs 212 formed on opposing arms 211 of the band element. Each opposing arm 211, in turn, depends from the stop element 230 and rotationally connected thereto via to lines of weakness 250*a*, 250*b* spaced apart from one another, as shown in FIG. 7. The spacing of the lines of weakness 250*a*, 250*b* corresponds to a thickness of the stop element 220 that is disposed to translate back and forth within the band member 210 and incorporates tolerances sufficient to ensure that the stop element 220 motion is not unduly restricted (e.g., binding, etc.). To form the band member 210, the opposing arms 211 are rotated about the lines of weakness 250*a*, 250*b* and the locking tabs 212 rotated outwardly along lines of weakness formed at the connection between the opposing arms 211 and the locking tabs 212. This permits the locking tabs 212 to pass one another as the opposing arms 211 are folded over the stop element 230 to define a channel (not numbered) within which the stop element 220 is translatably received, as shown in FIGS. 5-6.

In another example, the band element 210 is an element separate to each of the stop elements 220, 230 and the band element 210 need not be integral to either of the stop elements 220, 230. In still another example, a plurality of band elements 210 are provided along the path of movement between the stop elements 220, 230. In yet another example, the band element 210 does not fully circumscribe the stop element 220 and instead only partially circumscribes the stop element 220 sufficient to retain a positional and operational relation between the stop elements 220, 230.

In the example configuration of FIG. 7, the tabs 225, 235 are configured with one or more lines of weakness 240 to facilitate rotation of one or more portions of the tabs 225, 235 relative to the respective tab 225, 235 to reduce a dimensional profile of the tab 225, 235. This configuration permits the tab 225, 235 to readily fit within and through a slot 155 in a joint 140 and further permits rotation of the one or more portions of the tabs 225, 235 relative to the respective tab 225, 235 to increase the dimensional profile of the tab 225, 235 to lock the tab relative to the slot 155.

Figure 8A:
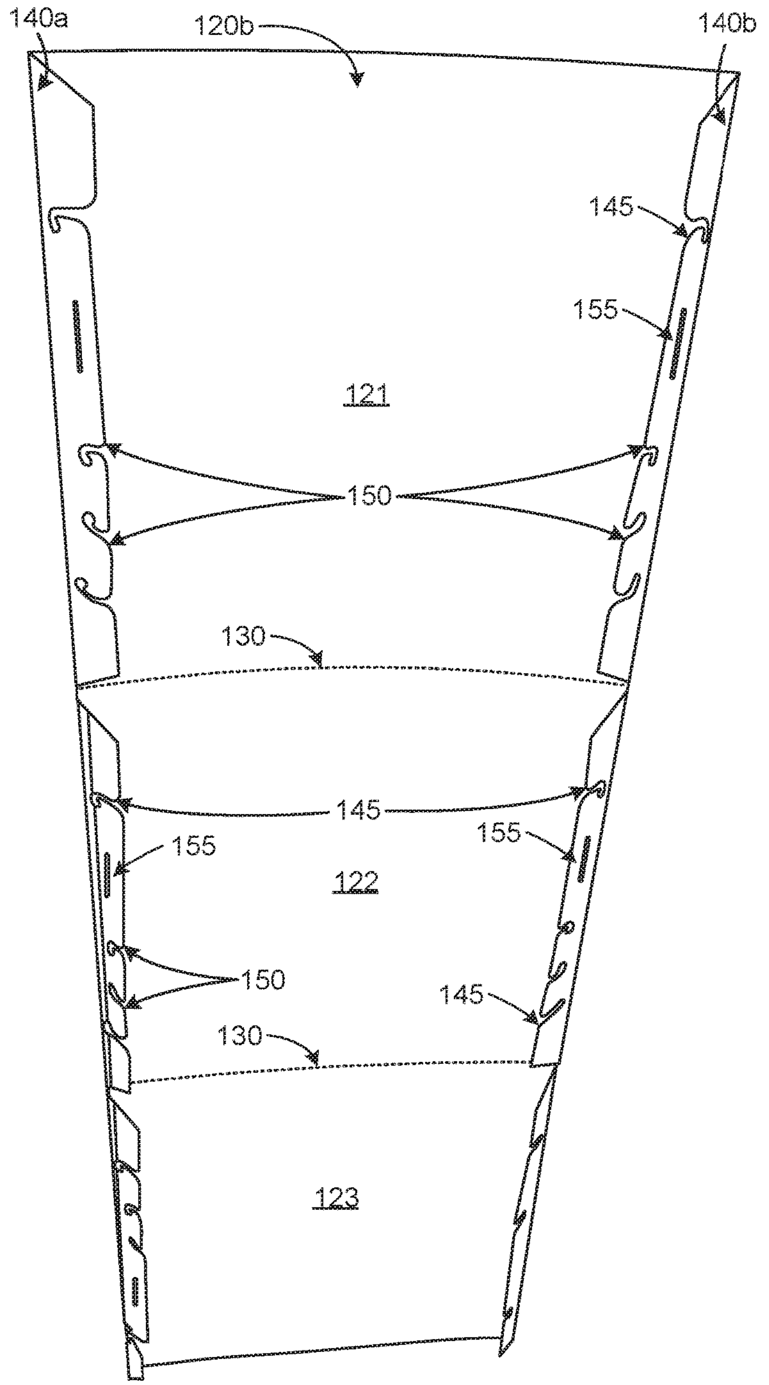
FIGS. 8*a*-8*b* show an example of construction of an example pop-up display in accordance with teachings disclosed herein.
Figure 8B:
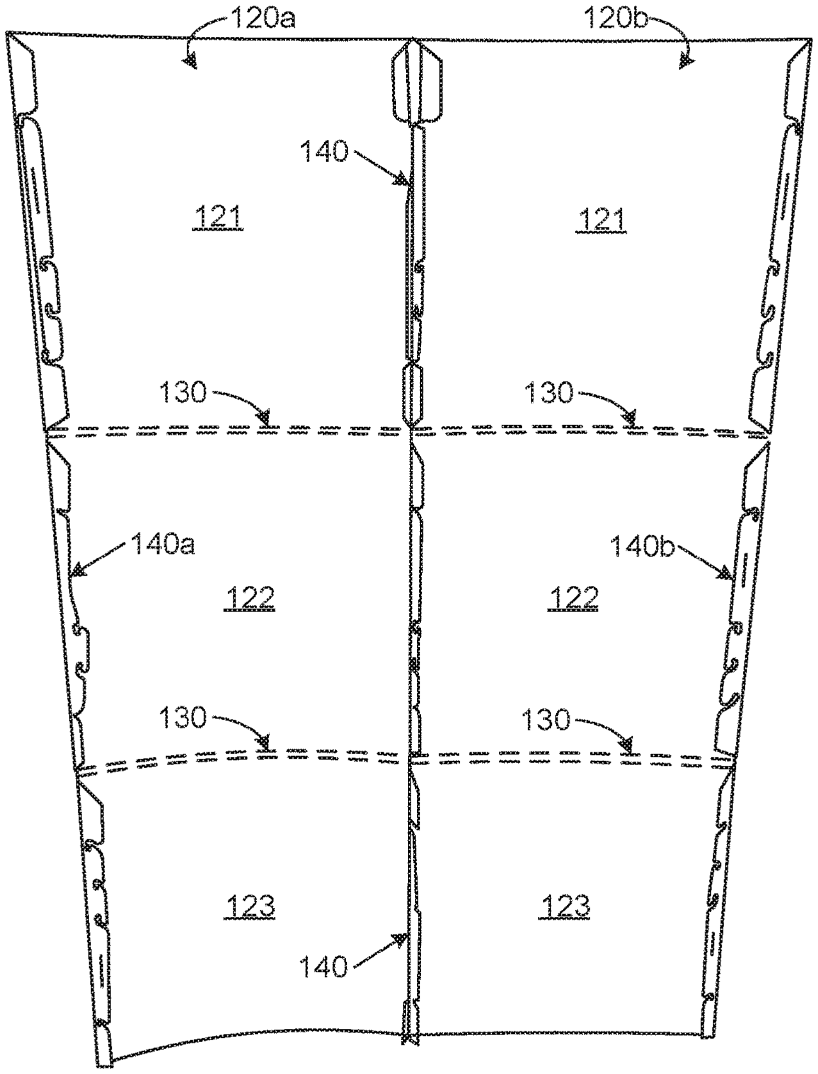

FIG. 8*a* illustrates an example of construction of an example of a sheet 120*b* for a pop-up display 100 in accordance with teachings herein. FIG. 8*b* shows an example of an intermediary state of formation of an example pop-up display 100 wherein two sheets 120*a*, 120*b* are connected together along adjacent flaps 140*a*, 140*b* at one side of the pop-up display 100. FIG. 8*a* shows a three-segment sheet 120*b* in isolation, highlighting the top segment 121, middle segment 122 and bottom segment 123, flaps 140*a*, 140*b*, and the various structures formed in the flaps 140*a*, 140*b*. As noted above, each flap 140*a*, 140*b* in the example sheet 120*b* shown defines a variety of features including example grooves 145, example grooves 150 and example slots 155, described herein. These features are also correspondingly provided in the opposing sheet 120*a*, as is shown in FIG. 8*b*. The dimensions and relative dimensions of these features are able to be varied and the examples provided are merely for purposes of illustration. In one example, the top and bottom grooves 145 in each example flap 140*a*, 140*b* of sheets 120*a*, 120*b* retain an example elastic member 160 that is used to connect example sheets 120*a*, 120*b* together, as discussed above. Example grooves 150 are used to retain an elastic member 170 (not shown in FIG. 8*a*, see. e.g., FIG. 3) that biases the flaps 140*a*, 140*b* toward one another until movement of the flaps 140*a*, 140*b* is stopped by action of a stop member 200 (not shown in FIG. 8*a*, see. e.g., FIG. 3) attached to slots 155.

In FIG. 8*b*, a first sheet 120*a* having a first flap 140*a* (left lateral side) and a second flap 140*b* (right lateral side) is placed adjacent to a second sheet 120*b* having a first flap 140*a* (left lateral side) and a second flap 140*b* (right lateral side). Each of the sheets 120*a*, 120*b* have substantially similarly configured and situated features (e.g., slits, grooves, slots, lines of weakness, etc.). In a method in accordance with teachings herein, a lateral end of the first sheet 120*a* is placed adjacent to a lateral end of the second sheet 120*b* to place the flaps 140*a*, 140*b* in abutment and the flaps 140*a*, 140*b* are joined to form a first joint 140. In the example shown, the flaps 140*a*, 140*b* are joined to form the first joint 140 using elastic members 160 (see, e.g., FIG. 3). In other examples, the flaps 140*a*, 140*b* are joined by adhesives or mechanical connectors.

Following the state depicted in FIG. 8*b*, one end of stop members 200 (e.g., tab 225) are inserted through slots 155 formed in the first joint 140 (the combined flaps 140*a*, 140*b*) and one end of the elastic members 170 are secured within the grooves 150. The other end of the stop members 200 are disposed adjacent to the corresponding structures formed in the opposing flap or, alternatively, are engaged to the corresponding structures formed in the opposing flap (e.g., grooves 150, slots 155). The sheets are then folded over one another, such as by folding sheet 120*a* over sheet 120*b* to place free flap 140*a* of sheet 120*a* adjacent the free flap 140*b* of sheet 120*b*. So positioned, the other (free) end of the stop members 200 (e.g., tabs 235) are inserted, segment by segment, through slots 155 and the other end of the elastic members 170 are secured within the grooves 150 to form second joint 140 (the combined free ends of flaps 140*a*, 140*b*). In the example illustrated, elastic members 160 are then, segment by segment, disposed in the grooves 145 in the second joint 140 of flaps 140*a*, 140*b* to complete the example three segment pop-up display 100.

Although an example of structures (e.g., grooves 145, grooves 150, slots 155, etc.) have been depicted to illustrate an example of a connection between two sheets 120*a*, 120*b* to form an example pop-up display 100, other structures and/or materials may be used to join two (or more) sheets together (e.g., adhesives, ties passed through holes or eyelets formed in the sheets, etc.). Moreover, a pop-up display in accord with other aspects of the teachings herein may be formed from a single sheet, with a first joint 140 being formed from a fold along a line of weakness and a second joint 140 being formed from flaps 140*a*, 140*b*, as described herein. As this shroud 120 would lack flaps 140*a*, 140*b* at one joint 140, the support members 200 would be adapted to secure to the sheet in another manner. For example, the stop element 230 proximal end, rather than having a tab 235 as shown, has two tabs (a top tab and a bottom tab) having lines of weakness formed along a width thereon (e.g., along a height in the deployed, vertically standing pop-up display). The top tab is then folded toward a first side of the sheet relative to the folded joint of the sheet and the bottom tab is folded toward a second side of the sheet relative to the folded joint of the sheet. The top tab and the bottom tab are then adhesively secured to the sheet on respective sides of the folded joint. In such example, the grooves 150 of flaps 140*a*, 140*b*, and the second joint 140 formed thereby, would secure a first end of the elastic member 170, such as is shown by way of example in FIG. 5. Since first joint 140 of this example shroud 120 lacks flaps 140*a*, 140*b* and, correspondingly, grooves 150 formed therein to receive the elastic member 170, one or more separate attachment members are provided within the shroud 120 to receive and retain the second end of the elastic member 170. In one example, a separate connection member (not shown) corresponding in shape and position to the flaps 140*a*, 140*b* and grooves 150 (see, e.g., FIG. 5) and having hinged attachment tabs (e.g., hinged via lines of weakness in the material, etc.) is adhered, via adhesives on the hinged attachment tabs, to the single sheet on either side of the first joint 140 to provide an anchor point for the second end of the elastic member 170.

FIGS. 9*a*-9*b* show an example of a foldable stand 120 that is optionally integrated with the pop-up display of FIGS. 1-8*b* in accordance with teachings disclosed herein. The foldable stand 102 has a line of weakness 330 bisecting the foldable stand 102 into two halves, which are foldable upon one another, such as is shown in FIG. 9*a*. While the example foldable stand 102 has a circular shape, other shapes may be advantageously utilized including, but not limited to, square, rectangular, or polygonal. One or more cutouts, defining retention grooves 310, are formed in the foldable stand 102 symmetrically about the line of weakness 330. In each of the retention grooves 310, a first end of an elastic member 320 is retained. In the unfolded or deployed position, shown in FIG. 9*b*, in which the foldable stand 102 is attached the shroud 120 (e.g., FIG. 1), a second end of the elastic member 320 is then biased toward and secured around, in one example, the lowermost groove 145 in the lowermost segment (e.g., segment 123). In the example shown in FIG. 3, wherein the bottom segment 123 is shown upside-down the second end of the elastic member 320 is disposed about the "topmost" (as shown) lobe of the two-lobed groove 145 and the (upside-down) display 100 may then be inverted to rest the display 100 on the stand 105, such as is represented in FIG. 1.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pop-up display apparatus, comprising:

a shroud including a first sheet and a second sheet disposed in opposition to one another, the first sheet and the second sheet being connected to one another at a first side by a first joint and at a second side by a second joint;

a stop member disposed between the first sheet and the second sheet and between the first joint and the second joint, the stop member being connected to the first joint and the second joint at a first height along a height of the shroud, the stop member including:

a first stop element and a second stop element arranged for translational movement in opposite directions relative to one another between a first position and a second position; and a band element within which the second stop element translates relative to the first stop element, the band element formed from a first arm and a second arm depending from the first stop element, wherein at least a first line of weakness and a second line of weakness is formed between the first stop element and the first arm to permit rotation of the first arm relative to the first stop element, the first line of weakness being spaced apart from a second line of weakness by a distance greater than a thickness of the second stop element; and an elastic member, separate from the stop member, connected to the first joint and the second joint, the elastic member being at a second height along the height of the shroud and being configured to bias the first joint toward the second joint, wherein the first position of the stop member corresponds to a stowed state of the pop-up display and a substantially flat shroud profile, and wherein the second position of the stop member corresponds to a deployed state of the pop-up display and a convex shroud profile.

2. The pop-up display apparatus of claim 1, wherein the first sheet and the second sheet are connected to one another at the first side by a first flap and a second flap, the first flap and the second flap forming the first joint.

3. The pop-up display apparatus of claim 2, wherein the first sheet and the second sheet are connected to one another at the second side by a third flap and a fourth flap, the third flap and the fourth flap forming the second joint.

4. The pop-up display apparatus of claim 3, wherein the stop member is affixed at a first end to the first joint formed by the first flap and the second flap.

5. The pop-up display apparatus of claim 4, wherein the stop member is affixed at a second end to the second joint formed by the third flap and the fourth flap.

6. The pop-up display apparatus of claim 5, wherein the stop member is affixed to the first joint, at the first end, via a first tab passing through a slot formed in the first flap and the second flap.

7. The pop-up display apparatus of claim 6, wherein the stop member is affixed to the second joint, at the second end, via a second tab passing through a slot formed in the third flap and the fourth flap.

8. The pop-up display apparatus of claim 7, wherein the first stop element is affixed to the first joint via the first tab, and wherein the second stop element is affixed to the second joint via the second tab.

9. The pop-up display apparatus of claim 1, wherein at least a third line of weakness and a fourth line of weakness is formed between the first stop element and the second arm to permit rotation of the second arm relative to the first stop element, the third line of weakness being spaced apart from the fourth line of weakness by a second distance, the second distance being greater than the thickness of the second stop element.

10. The pop-up display apparatus of claim 9, wherein at least one of the first arm and the second arm include a locking tab.

11. The pop-up display apparatus of claim 1, wherein the shroud includes a plurality of segments defined by lines of weakness formed in the first sheet and the second sheet.

12. The pop-up display apparatus of claim 11, wherein each of the plurality of segments includes a stop member and an elastic member, the stop member and the elastic member being separated from one another in the segment.

13. The pop-up display apparatus of claim 12, wherein each of the stop members includes a first stop element and a second stop element arranged for translational movement in opposite directions relative to one another between a first position and a second position.

14. The pop-up display apparatus of claim 1, wherein compressive forces applied to central portions of the first sheet and the second sheet overcome the bias of the elastic member and move the stop member from the second position corresponding to the deployed state to the first position corresponding to the stowed state.

15. A method of forming a pop-up display apparatus, comprising:

disposing an elongated first sheet having a first lateral flap and a second lateral flap adjacent to a second elongated sheet having a third lateral flap and a fourth lateral flap, each of the first elongated sheet and second elongated sheet having transverse lines of weakness spaced apart along a length thereof;

connecting the second lateral flap to the third lateral flap to form a first joint;

connecting a first end of a stop member to the first joint at a first height along the elongated first sheet, the stop member including:

a first stop element and a second stop element arranged for translational movement in opposite directions relative to one another between a first position and a second position; and a band element within which the second stop element is to translate relative to the first stop element, the band element formed from a first arm and a second arm depending from the first stop element, wherein at least a first line of weakness and a second line of weakness is formed between the first stop element and the first arm to permit rotation of the first arm relative to the first stop element, the first line of weakness being spaced apart from a second line of weakness by a distance greater than a thickness of the second stop element;

connecting a first end of an elastic member to the first joint at a second height along the elongated first sheet, the first height being spaced apart from the second height;

folding the elongated first sheet over the second elongated sheet to place the fourth lateral flap adjacent the first lateral flap;

connecting the first lateral flap to the fourth lateral flap to form a second joint and define a shroud having an enclosed volume;

connecting a second end of the stop member to the second joint at the first height along the elongated first sheet; and connecting a second end of the elastic member to the second joint at the second height along the elongated first sheet, wherein the first position of the stop member corresponds to a stowed state of the pop-up display and a substantially flat shroud profile, and wherein the second position of the stop member corresponds to a deployed state of the pop-up display and a convex shroud profile.

16. The method of forming the pop-up display apparatus of claim 15, further including:

collapsing the shroud by moving the first sheet and the second sheet toward one another to cause the stop member to move from the second position to the first position.

17. The method of forming the pop-up display apparatus of claim 16, further including:

folding the shroud along the transverse lines of weakness.

* * * * *